R. PARKER & J. B. COLMAN.
Clamps for Holding Files in Tempering-Baths.

No. 164,204.                     Patented June 8, 1875.

WITNESSES.
J. W. Larner,
C. W. Lemon.

INVENTORS
Robt. Parker
J. B. Colman
per F. A. Lehmann
Atty.

THE GRAPHIC CO.PHOTO-LITH.39 & 41 PARK PLACE,N.Y.

UNITED STATES PATENT OFFICE.

ROBERT PARKER AND JOHN B. COLMAN, OF CORRY, PENNSYLVANIA.

IMPROVEMENT IN CLAMPS FOR HOLDING FILES IN TEMPERING-BATHS.

Specification forming part of Letters Patent No. 164,204, dated June 8, 1875; application filed April 23, 1875.

*To all whom it may concern:*

Be it known that we, ROBT. PARKER and JNO. B. COLMAN, of Corry, in the county of Erie and State of Pennsylvania, have invented certain new and useful Improvements in Clamps for Holding Files; and we do hereby declare the following to be a full, clear, and exact description of the invention, such as will enable others skilled in the art to which it pertains to make and use it, reference being had to the accompanying drawings, which form part of this specification.

The nature of our invention relates to an improvement in clamps for holding files; and it consists in the arrangement and combination of parts, as hereafter described and claimed.

Figure 1:
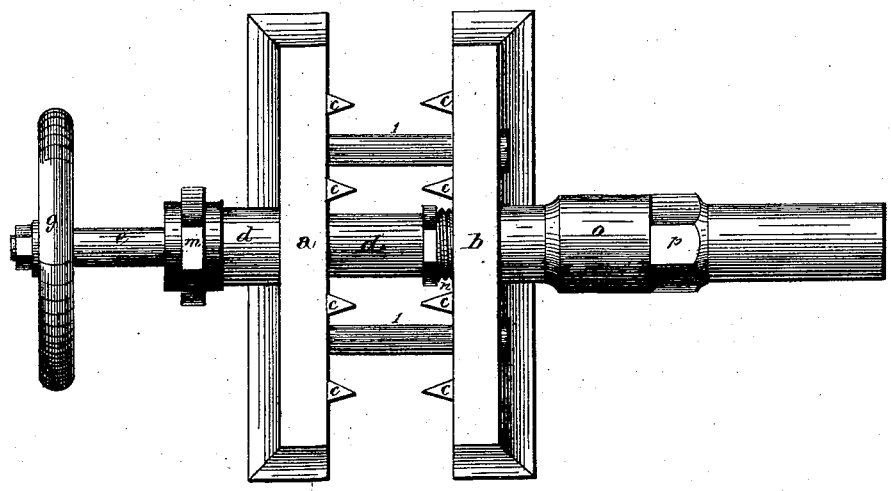
Figure 2:
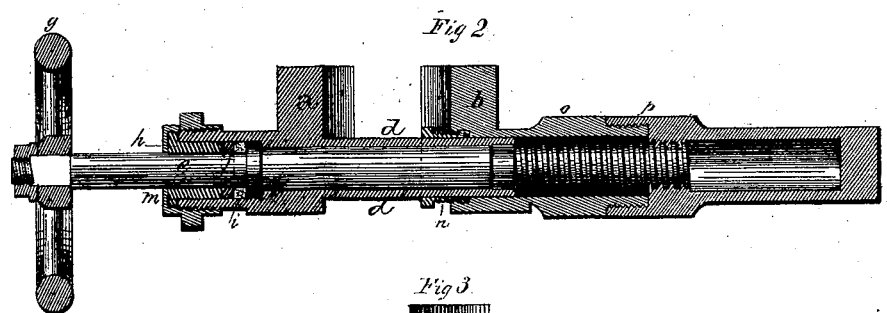
Figure 3:

Figure 1 is a plan view of our invention. Fig. 2 is a sectional view of the same; Fig. 3, an enlarged side view of a tooth detached.

$a$ $b$ represent the two jaws of the clamp, each of which is provided with a suitable number of teeth, $c$, which teeth are preferably made detachable by any suitable means coming within the province of an ordinary mechanic, such as by grooves, pins, screws, &c., so that they can be removed at will. As the teeth are here shown they are only adapted to hold straight files, for the purpose of preventing them from warping while being immersed in the bath for hardening them; but, by removing certain of these teeth and substituting others of different widths, the jaws will hold securely, and in line therewith, files varying in size and shape—as, for instance, the ordinary three-cornered file, which tapers toward one end, and which would, therefore, to be properly held, require teeth gradually increasing in width. Cast with the jaw $a$, so as to extend beyond each side of it, is a sleeve, $d$, through which the screw-rod $e$, having the hand-wheel $g$ upon its outer end, passes. In the outer end of this sleeve is formed a stuffing-box, $h$, in which is placed the packing $i$, ring $j$, and gland $l$, which parts are held in place by the screw-cap $m$. The longer and inner end of the sleeve $d$ passes through the jaw $b$, in which there is formed a stuffing-box, $n$, and into the sleeve $o$, cast with the jaws. By means of these two stuffing-boxes, $h$ $o$, any of the liquid that is used to harden the files is prevented from getting into the screw-rod $e$, which rod, when made of iron, would soon be so corroded and eaten by the acid as to be useless. On the outer end of the sleeve $o$ is cut a screw-thread, so as to attach the screw-socket $p$, into which the screw-thread on the rod $e$ passes, and draws the two jaws together. Passing through holes in the jaw $b$, and screwing into the jaw $a$, are the two rods 1, which serve as a support for the files, and also as guides to keep the jaws straight and true in their motions back and forth.

The hand-wheel $g$, for operating the screw-rod $e$, should be of such a size that when the files are immersed in the liquid, a portion of the wheel will extend above the top of the acid, so that it can be turned without getting the hand wet.

The ring $j$ is placed between the end of the gland and the packing $i$, in order to prevent the wearing of the packing.

Having thus described our invention, we claim—

1. The combination of the jaws $a$ $b$, teeth $c$, rods 1, screw-rod $e$, sleeves $d$ $o$, and stuffing-boxes $h$ $n$, substantially as shown.

2. The jaws $a$ $b$, provided with the sleeves $d$ $o$, in combination with the stuffing-boxes $h$ $n$ and screw-rod $e$, substantially as shown.

In testimony that we claim the foregoing we have hereunto set our hands this 20th day of April, 1875.

ROBERT PARKER.
J. B. COLMAN.

Witnesses:
T. W. TYLER,
S. B. BROOKS.